United States Patent Office.

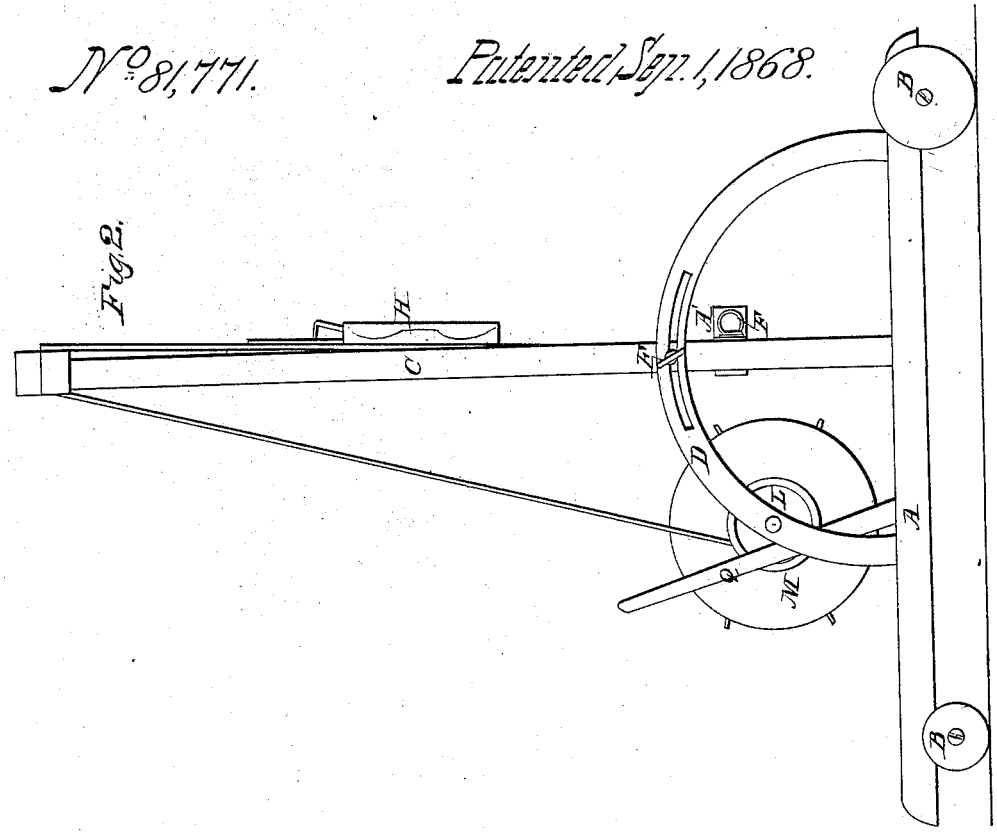
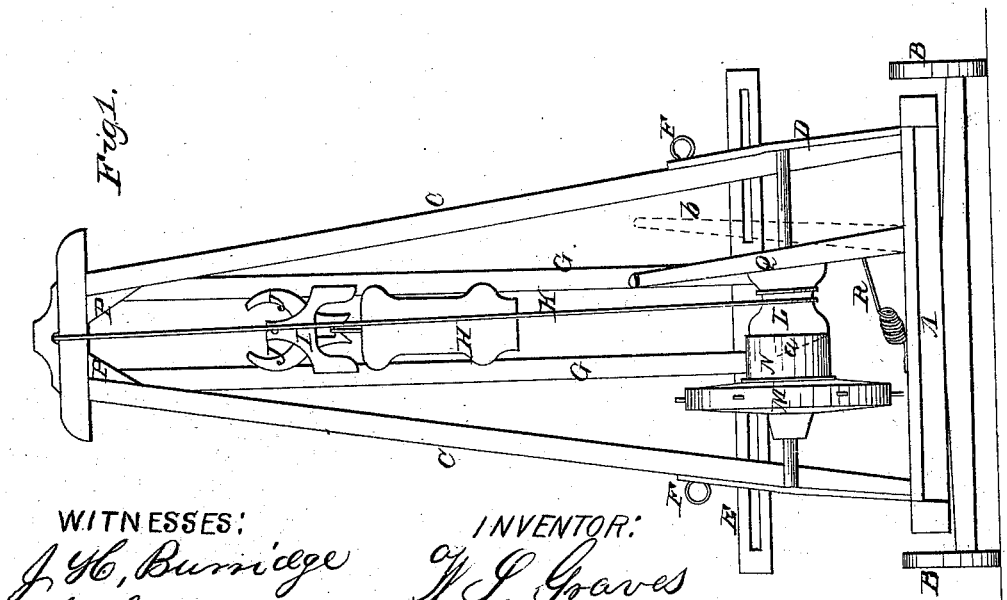

WILLIAM S. GRAVES, OF OBERLIN, OHIO.

Letters Patent No. 81,771; dated September 1, 1868.

IMPROVED FENCE-POST DRIVER.

*The Schedule referred to in these Letters Patent and making part of the same.*

TO ALL WHOM IT MAY CONCERN:

Be it known that I, WILLIAM S. GRAVES, of Oberlin, in the county of Lorain, and State of Ohio, have invented certain new and useful Improvements in Fence-Post-Drivers; and I do hereby declare that the following is a full and complete description of the same, reference being had to the accompanying drawings, making a part of this specification, in which—

Figure 1 is a front view of the driver.

Figure 2 is a side view.

Like letters of reference refer to like parts in the views.

Of this driver, A, fig. 1, is the platform or carriage, mounted upon wheels B, for the greater facility of moving the machine.

Erected upon this carriage is a frame, C, and to which the lower ends are pivoted, and is supported in a vertical or other position by the semicircular stay D, fig. 2.

Placed transversely across the lower part of the frame is a slotted rail, E, fig. 1, and which is secured to the frame by hand-screws F, fig. 2.

G, fig. 1, is a pair of ways or guides, the upper ends of which are fastened to the top of the frame, and the lower ends to the rail.

Between these ways is fitted a weight or hammer, H, and which is connected to the cross-head I by means of the adjusting-hook J.

This hook is constructed in two parts, each part of the shape shown in the drawing, and are pivoted at the centre, in the head, so that, on bringing the curved ends of the hook together, the lower ends will spread out.

The superior weight of each hook being above the pivot, will cause the hooks to approach and lock, as seen in the drawing, when influenced by the angles P, as will hereafter be shown.

To this cross-head referred to is attached a rope, K, which reaches up to and passes through the top of the frame, over a sheave, thence to a windlass, L, around which it winds, and draws up the weight or hammer, as will presently be shown.

This windlass consists of two sections, viz:

L, the spool around which the rope winds, and

M, the wheel by which the power is applied for winding.

The two sections are connected to each other by an ordinary clutch, indicated by the dotted lines $a$, fig. 1, enclosed in the drum N.

The two sections, as shown in the drawing, are engaged; hence, on turning the wheel M, the spool will be carried around with it, and thus wind up the rope.

The application and manner of operating this machine are as follows:

The driver is so placed as to bring it in line with the direction of the fence, which is then adjusted so as to bring the hammer over the post to be driven into the ground. This post is held straight, while being driven, by a yoke or collar, A', fig. 2, in which the post is placed and held.

The driver and post being properly arranged, the weight or hammer is then drawn up until the curved arms of the hooks strike against the angle P, referred to, the result of which will be to force the arms together which, at the same time, will cause the hooks to part and release the hammer, which will descend upon the head of the post and drive it into the ground. The hammer is again drawn up, and the operation repeated as before.

In order to facilitate the descent of the cross-head and hook after detaching the weight, the spool on which the rope is wound is drawn out from the drum by means of the lever Q, by pushing it in the direction of the dotted lines $b$, and thus disengaging the clutch. The spool being loose on the shaft, will rapidly unwind the rope, by the weight of the cross-head and hook, and thus descend much more rapidly than if the wheel M and spool turned together, the head and hook not being sufficiently heavy to operate both but slowly. The spring R draws back the lever, and thus engages the spool with the wheel, by means of the clutch.

The position of the driver as thus described and shown is for driving posts in flat and level ground. Should it be required to drive them on side-hills, the position of the frame must be changed, and which is done by means of the semicircular stay D and slotted rail E. By this it will be evident that the position of the frame may be changed to any direction the nature of the ground may require to bring it to a vertical line, and thus drive the post vertically into the ground.

What I claim as my improvement, and desire to secure by Letters Patent, is—

Segmental stay D and slotted rail E, as arranged, in combination with the ways or guides $b$ and frame C, for the purpose specified.

WM. S. GRAVES.

Witnesses:
J. H. BURRIDGE,
A. NARAMOR.